June 6, 1939.　　　G. C. MILLER ET AL　　　2,161,775
METHOD AND APPARATUS FOR MANUFACTURING INNER TUBES
Filed Sept. 20, 1935　　2 Sheets-Sheet 1
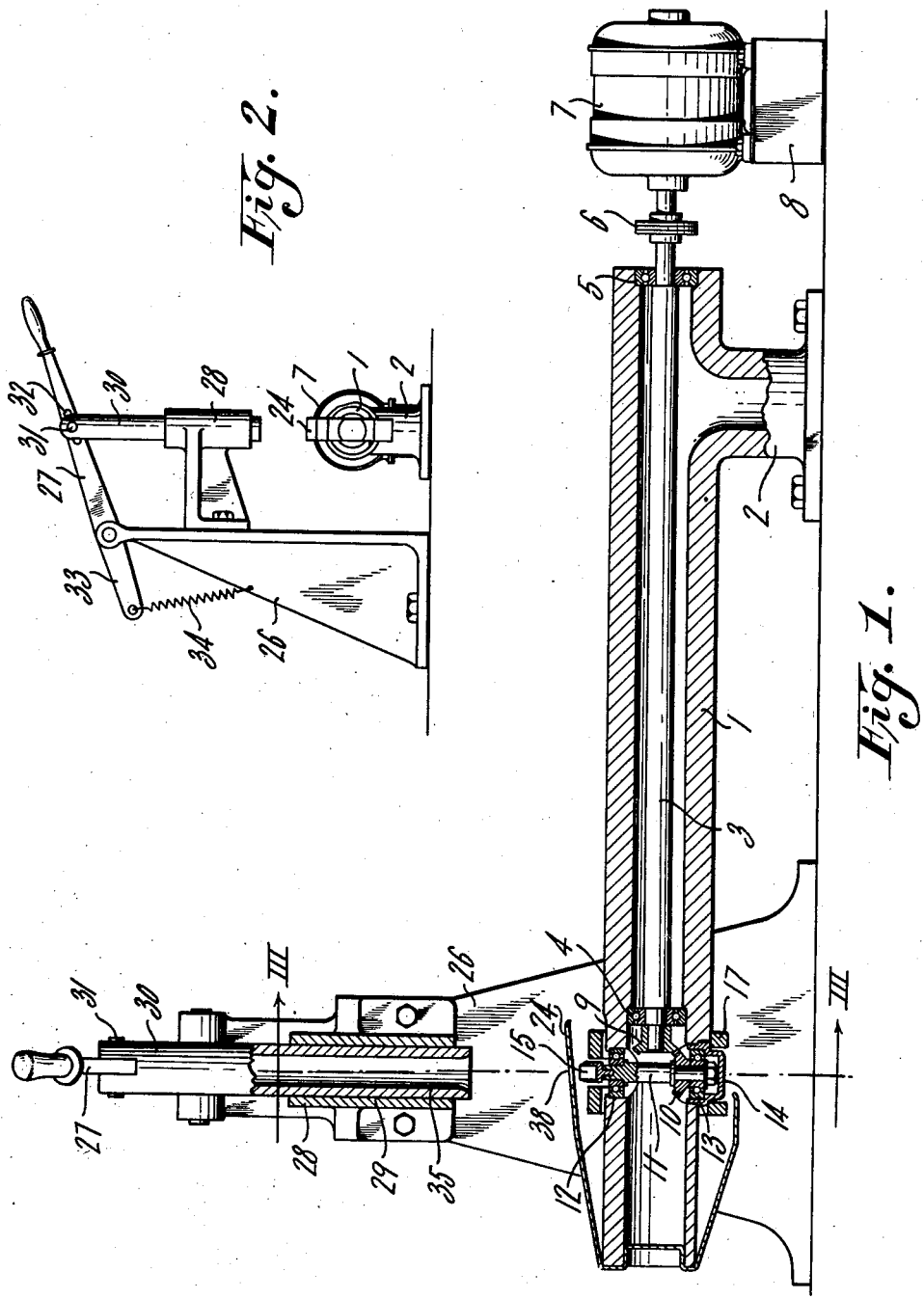
INVENTORS
ROBERT C. SOURWINE
GROVER C. MILLER
BY 
ATTORNEY.

June 6, 1939.   G. C. MILLER ET AL   2,161,775
METHOD AND APPARATUS FOR MANUFACTURING INNER TUBES
Filed Sept. 20, 1935   2 Sheets-Sheet 2

INVENTORS
ROBERT C. SOURWINE
GROVER C. MILLER
BY
ATTORNEY.

Patented June 6, 1939

2,161,775

UNITED STATES PATENT OFFICE 2,161,775

METHOD AND APPARATUS FOR MANUFACTURING INNER TUBES

Grover C. Miller, Los Angeles, and Robert C. Sourwine, Walnut Park, Calif., assignors to Samson Tire & Rubber Corporation, Los Angeles, Calif., a corporation of Delaware Application September 20, 1935, Serial No. 41,370

12 Claims.  (Cl. 154—9)

Our invention relates to inner tubes, and in particular it relates to a method and means for obtaining an aperture in an inner tube in alignment with an aperture in a valve stem of the rubber base type.

Present developments in the manufacture of inner tubes include the application of a valve stem having a rubber base to an inner tube. As distinguished from the ordinary metal valve stem with its mechanical method of clamping the wall of the inner tube, the rubber valve stem presents new and different methods of manufacture.

Early practices in the method of applying the rubber valve stem to the inner tube were both inaccurate and inefficient. For example, it has been customary, after an inner tube is extruded from a tubing machine, to coat the outer surface with a layer of lubricating material such as soapstone powder. Also, the interior of the inner tube was likewise subjected to a dusting operation while the tube is in process of being extruded. This dusting operation serves to remove the tackiness of the rubber surface and permits the tube to be handled without danger of adhesion between similar rubber surfaces.

In order to attach the base of the rubber valve stem to an inner tube, it has been necessary to remove all the dusting material at a location where the base of the valve stem was to be applied.

It has been customary to prevent the application of the dusting material to the valve base region of the tube by applying to the tube a patch of sheet material impermeable to the dusting powder. This patch was applied before the dusting operation, and consisted of a film of paper-like material or "Cellophane" rolled down in contact enlargement with the tube. The film of "Cellophane" would adhere to the tube surface throughout the subsequent operations, and was removed when it was desired to apply the base of a valve stem. Preceding the application of the valve base, and after the film of "Cellophane" was removed from the surface of the tube, an operator would cause a hole to be drilled through the wall of the tube at the valve base region. The valve stem base was then applied in such manner that the aperture of the valve stem would be in alignment with the hole drilled in the wall of the inner tube.

When the hole was drilled or cut through the wall of the tube, it frequently occurred that a puff of dusting material issued from the interior of the tube and settled on the outer surface of the tube at the valve base region. Thereafter, when the base of the valve stem was applied to the tube, the dusting material which issued from the interior of the tube would act as a lubricant between the outer surface of the tube and the under surface of the valve stem base. The presence of the dusting material prevented proper adhesion between the adjacent surfaces, and consequently resulted in the frequent occurrence of leakage between the surfaces of the base and tube in the finished tube. While many precautions have been taken to prevent dusting material from adhering to the valve base region on the surface of the inner tube, its elimination has been found extremely difficult.

In the practice of our invention the valve stem base is secured to the inner tube directly after the tube is extruded. The valve stem base is stitched down tightly in adhesion with the surface of the tube while the tube is still hot, and while its surface is free from dusting material. After the application of the valve stem the exterior of the tube is dusted and subsequently the tube is cut to length. Following this operation the tube is placed on means hereinafter described for drilling a hole through the wall of the inner tube and in alignment with the aperture in the valve stem. In this way the drilling operation in no way can result in a deposit of the dusting material on that surface of the tube where the valve stem base is applied.

It is, therefore, an object of my invention to attain a better adhesion between the surface of an inner tube and the rubber base of a valve stem.

Another object is to insure accuracy of alignment of the aperture through the wall of the inner tube and the aperture in the valve stem A further object is to expedite the manufacture of inner tubes and consequently obtain economy in tube manufacture.

These and other objects and advantages will appear more fully in the following detailed description when considered in connection with the accompanying drawings, in which:

Fig. 1 is a side elevational view, partly in section of a cutting mechanism;

Fig. 2 is an end elevational view thereof;

Figure 3:
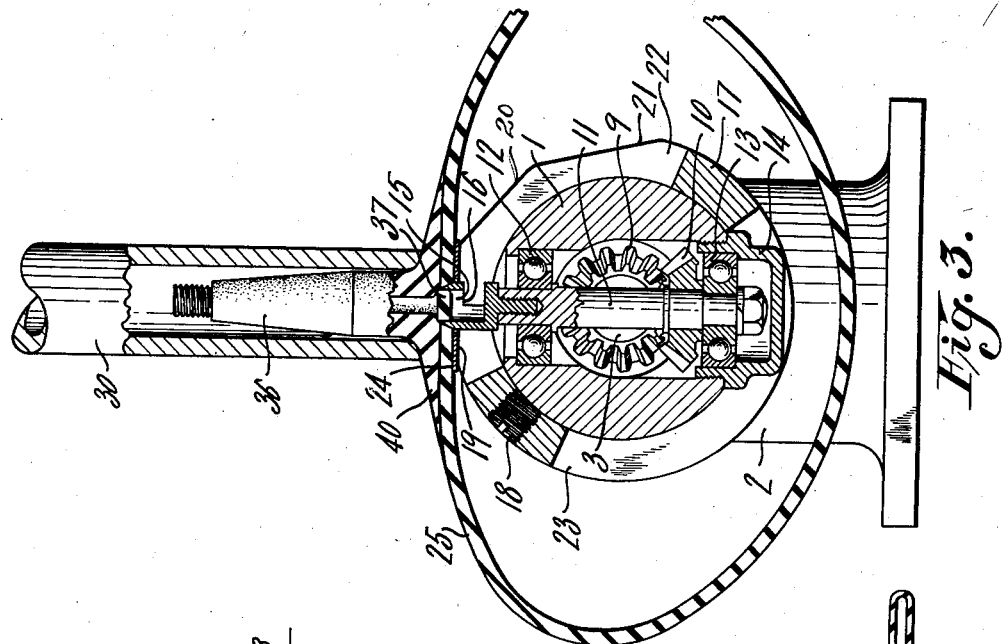
Fig. 3 is a transverse view, in section, taken along lines III—III of Fig. 1.
Figure 4:
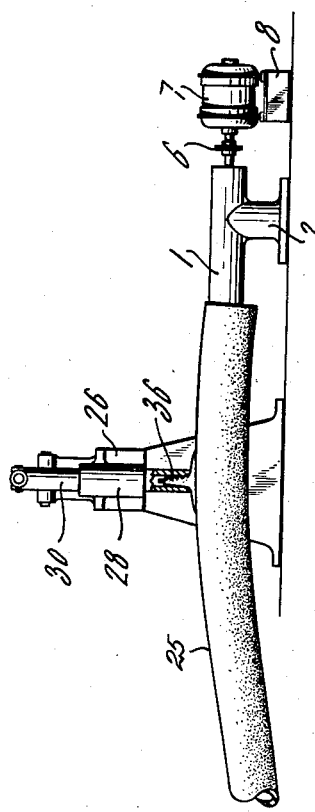
Fig. 4 is a side elevational view illustrating an inner tube in operative position on the cutting mechanism.
Figure 5:
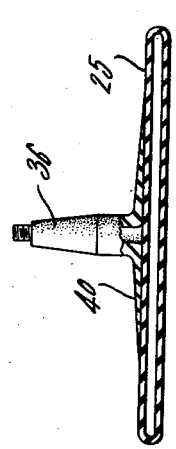
Figs. 5 and 6 are transverse views, partly in section, of an inner tube and valve stem assembly, illustrating the tube before and after treatment, respectively in accordance with the present invention.

With reference to the drawings, and in particular to Figs. 1 and 3, we show an apparatus for use in the manufacture of inner tubes. Numeral 1 indicates a horizontal tubular member held in spaced relation above a surface, such as a table top, by a supporting pedestal 2. Within the horizontal member 1 and in concentric relation therewith is a shaft 3 rotatably mounted in bearings 4 and 5. The outer end of the shaft 3 is attached to a coupling 6, and in turn is secured to the shaft of a motor 7. A block or bracket 8 operates to position the axis of the motor in alignment with the shaft 3.

At the opposite end of the shaft 3 and secured thereto is a miter gear 9 which intermeshes with a miter gear 10 secured to a short vertical shaft 11. One end of the shaft 11 is rotatably supported by a bearing 12 retained within a recess in the tubular member 1. The opposite end of the shaft 11 is rotatably supported by a bearing 13 mounted in a retainer 14 secured to the horizontal member 1. At the upper end of the shaft 11 is a punch-like drill 15 secured to the shaft as by threaded engagement. The drill 15 is hollow, and has a slot 16 cut in the side thereof so as to permit the removal of the material on which the drill operates.

As thus far described, a direct right-angle drive is provided wherein the drill 15 is subject to continuous rotation during operation of the motor 7.

Outside of the tubular member 1, and in a central position with the drill 15, is a collar 17 for the purpose of limiting the amount of extension which the drill 15 projects from the tubular member 1. A set screw 18 permits the locking of the collar 17 with the tubular member 1.

In order to accommodate the various thicknesses of the inner tube walls, we provide on the colla 17 flat surfaces 19, 20, and 21. These flat surfaces on the collar 17 are variously spaced from member 1 by predetermined different average radial thicknesses of the material of the collar 17, thus permitting the device to cooperate with different inner tubes having various wall thicknesses. By loosening the set screw 18 the collar 17 may be manually rotated a distance such that either of the other flat surfaces 20 or 21 may be located in the immediate position of the drill 15.

To accommodate the rotatable movement of the collar 17 a slot 22 is cut into the collar 17 to provide clearance for the drill 15. In a similar manner a slot 23 is made through the wall 17 to provide clearance for the bearing retainer 14.

As shown in particular in Fig. 1, a spring 24 is bent around the end of the tubular member 1, and extends part way along the outside of the tubular member 1. The purpose of the upper portion of this spring 24 is to hold an inner tube such as 25 away from the cutting edge of the drill 15 while the tube is being inserted and positioned in operative relation. The lower portion of the spring 24 facilitates the placing of the tube 25 over the end of the tubular member 1. A slot 38 in the spring 24 functions as a clearance hole to permit the spring 24 to be bent downward over the drill 15.

In cooperation with the supported rotating drill 15 is a hand press which consists essentially of a frame 26 pivotally supporting a hand lever 27. Extending from the frame 26 and secured thereto is a bracket 28 having an aperture 29 above and in axial alignment with the drill 15. A vertical tubular member 30 is slidable within the aperture 29 and is attached to the lever 27 by a pin 31 extending through a slot 32. Extension 33 forming a continuation of the lever 27 carries a spring 34 attached to the frame 26 for the purpose of maintaining the vertical tubular member 30 normally in an upward position. The tubular member 30 has an aperture 35 of a diameter adapted to fit loosely around the external diameter of a valve stem 36.

In the operation of the device an inner tube 25 having a valve stem 36 and base 40 applied to the tube as hereinbefore described is placed over the end of the horizontal tubular member 1 until the valve stem 36 is in substantial alignment with the vertical tubular member 30. At such time an operator grasps the hand lever 27 and moves it in a downward motion. This operates to center the valve stem 36 and to press the inner tube 25 downwardly against the drill 15. This operation also moves the spring 24 downward so that upon release of the manual lever 27 the spring 24 will move the tube 25 upward out of engagement with the drill 15. The drill 15 is in continuous rotary movement during the operation of the device. However, it is to be understood that rotary movement is not entirely essential as a downward pressure of the wall of the tube 25 against a stationary drill 15 will substantially accomplish the same purpose.

The thickness of the collar 17 limits the distance in which the drill penetrates the wall of the tube 25, and prevents the drill from cutting into the base 40 of the valve stem 36. A slight cut into the base 40 of the valve stem, however, will not harm the base of the stem.

When the cutting operation, which occurs quickly, is completed the operator releases the lever 27 and the spring 34 returns the vertical member to its normal upward position.

The tube 25 is next removed from the horizontal tubular member 1, and the operator manually removes a plug 37 or that portion of the sidewall of the inner tube which is cut by the drill 15. This plug 37 is easily removed by the operator who places his hand through the end of the tube 25 and picks out the plug 37 with his finger or fingernail.

The valve stem 36 is attached to the inner tube 25 a short distance from the end of the tube 25. This permits easy access by the operator through the interior of the tube to the region of the valve stem base 40. Ordinarily the plug 37, due to the pressure of the valve stem base 40 against the drill 15 during the cutting operation, is pressed against the under side of the base of the valve stem, and consequently the plug adheres slightly to the under side of the valve base 40. Sometimes, however, the plug 37 does not adhere to the valve base 40, but remains within the aperture of the drill 15. In such case, in subsequent cutting operations, the plug 37 moves downward into the drill aperture and is finally ejected out of the slot 16 at the base of the drill 15.

Figure 6:
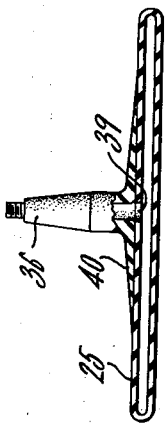

As shown in Fig. 6, the removal of the plug 37 leaves an aperture 39 in the wall of the inner tube 25 in direct alignment with the aperture of the valve stem 36.

After removal of the tube 25 from its operative position on the drilling device, and after the plug 37 is manually removed from the aperture 39, the tube is in condition for splicing, or any further subsequent operation in accordance with conventional methods of manufacturing inner tubes.

It is to be understood that the present invention refers to valve stems having bases which are applied to inner tubes by means of surface adhesion, and includes rubber valve stems or metal stems, or combinations of rubber and metal stems.

While we have shown and described certain preferred embodiments of our invention, it is to be understood that other embodiments may be made within the spirit of the invention and the scope of the appended claims.

Having thus described our invention, what we claim and desire to protect by Letters Patent is:

1. In the method of applying to an inner tube a valve stem having a longitudinal passageway, the steps comprising applying the valve stem to an unprepared external surface of the tube and forming an opening in the inner tube in alignment with the passageway in the valve stem from the interior of the inner tube.

2. In the method of applying to an inner tube a valve stem having a longitudinal passageway, the steps comprising applying the valve stem to a previously undetermined external surface of the tube and cutting an opening in the inner tube in alignment with the passageway in the valve stem from the interior of the inner tube.

3. In the method of attaching to an inner tube of rubber composition a valve stem having a base of rubber composition, the steps comprising applying the base of the valve stem to an external surface of an inner tube while in a tacky condition and near an open end thereof and forming an opening in the wall of the inner tube from the interior thereof in alignment with the passageway in the valve stem.

4. In the method of attaching to an inner tube of rubber composition a valve stem having a base of rubber composition, the steps comprising applying the base of the valve stem to an external surface of an inner tube while in a tacky condition and before the application of dusty material to the inner tube and near an open end thereof, and forming an opening in the wall of the inner tube from the interior thereof in alignment with the passageway in the valve stem whereby the presence of dusty material between the base and the inner tube is prevented.

5. Apparatus for manipulating inner tubes comprising a support for an end of an inner tube, a cutting member carried by the support and insertable within an inner tube mounted on the support, and means for engagement with a valve stem carried by the inner tube and directing it toward the cutting member whereby the latter forms an opening through the wall of the inner tube in alignment with the valve stem.

6. Apparatus for manipulating inner tubes comprising a support for an end of an inner tube, a rotary cutting member carried by the support and insertable within an inner tube mounted on the support, and means for engagement with a valve stem carried by the inner tube and directing it toward the cutting member whereby the latter forms an opening through the wall of the inner tube in alignment with the valve stem.

7. Apparatus for manipulating inner tubes comprising a support over which an end of an inner tube may be drawn, means carried by the support for yieldingly engaging the inner surface of the inner tube, a cutting member carried by the support and projectable through the yielding means, and means for engaging a valve stem and pressing it and the inner tube against the yielding means for causing the cutting means to form an opening in the wall of the inner tube in alignment with the valve stem.

8. A tube manipulating mechanism comprising a support over which a tube end may be drawn, a cutting tool projecting therefrom, and means for supporting a tube mounted on said support comprising a collar movable on said support and having areas of different effective radial thicknesses relative to the support in cooperative relation to the cutting means whereby the effective projection of the cutting means relative to the support may be varied in accordance with the gauge of the tube stock being cut.

9. An inner tube manipulating mechanism comprising a support over which an end of the tube may be drawn, resilient means carried by the support for engaging an inner surface of the inner tube, a cutting tool projecting from the support in alignment with an opening in the resilient means, a collar having portions of different effective average radii movable relative to the support for engaging the resilient means and acting as a stop therefor for controlling the effective projection of the cutting tool in accordance with the gauge of tube stock being cut, and means for engaging a valve stem having a longitudinal passageway and directing it toward the cutting tool against the resilient means for forming an opening in the wall of the inner tube in alignment with the said passageway.

10. An inner tube manipulating mechanism comprising a support over which the end of the tube may be drawn, resilient means carried by the support for engaging an inner surface of the inner tube, a rotating cutting tool projecting from the support in alignment with an opening in the resilient means, a collar having portions of different effective average radii movable relative to the support for engaging the resilient means and acting as a stop therefor for controlling the effective projection of the cutting tool in accordance with the gauge of tube stock being cut, and means for engaging a valve stem having a longitudinal passageway and directing it toward the cutting tool against the resilient means for forming an opening in the wall of the inner tube in alignment with the said passageway.

11. Apparatus for manipulating inner tubes comprising a support for an end of an inner tube, a hole forming means carried by the support and insertable within an inner tube mounted on the support, and means for engagement with a valve stem carried by the inner tube and directing it toward the hole forming means whereby the latter forms an opening through the wall of the inner tube in alignment with the valve stem.

12. Apparatus for manipulating inner tubes comprising a support over which an end of an inner tube may be drawn, means carried by the support for yieldingly engaging the inner surface of the inner tube, hole forming means carried by the support and projectable through the yielding means, and means for engaging a valve stem and pressing it and the inner tube against the yielding means for causing the hole cutting means to form an opening in the wall of the inner tube in alignment with the valve stem.

GROVER C. MILLER.
ROBERT C. SOURWINE.